United States Patent Office 3,486,071
Patented Dec. 23, 1969

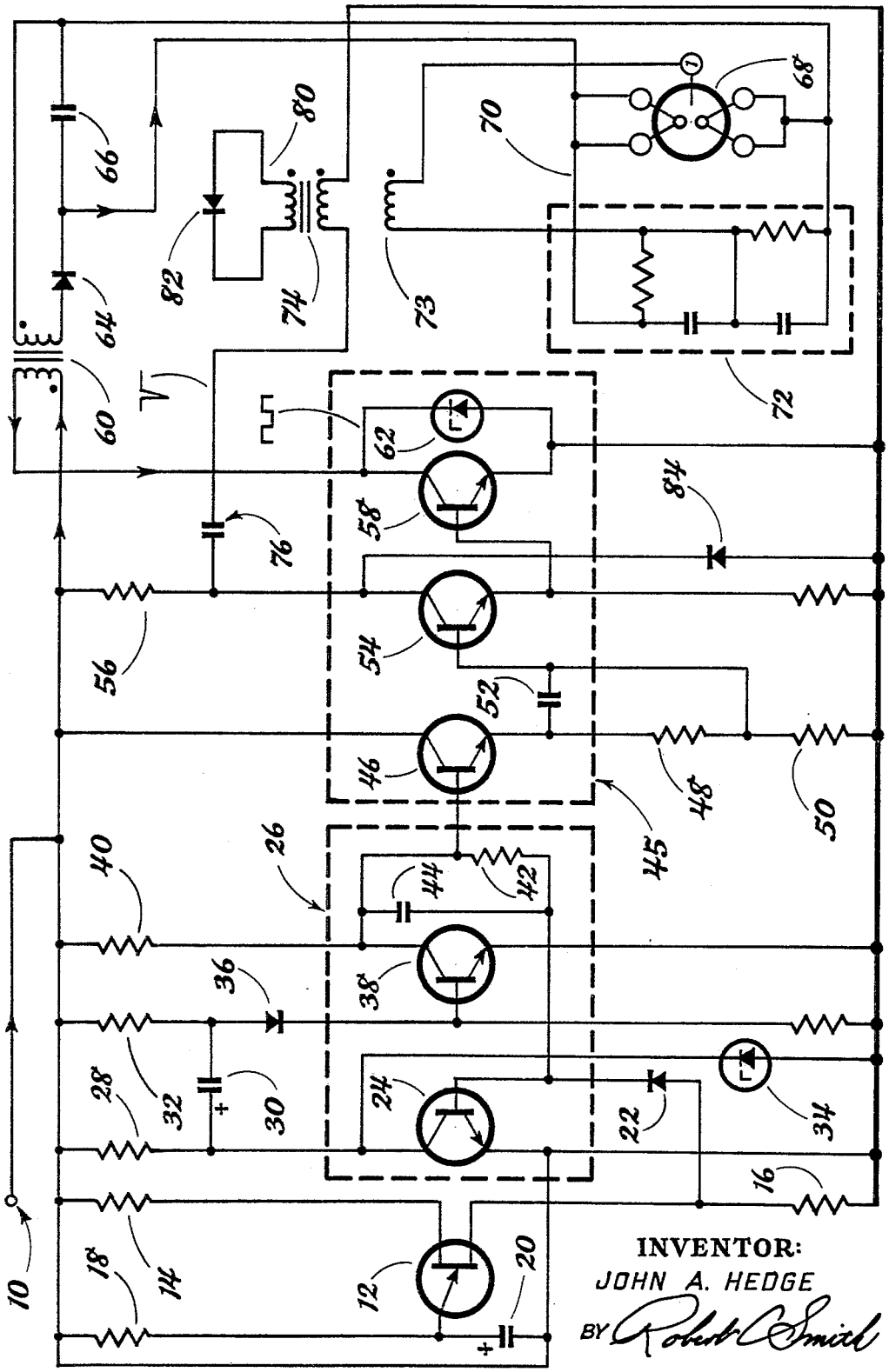

3,486,071
CIRCUIT FOR DELIVERING CONSTANT ENERGY IMPULSES TO A LOAD
John A. Hedge, Simi, Calif., assignor to The Bendix Corporation, a corporation of Delaware
Filed June 28, 1968, Ser. No. 741,139
Int. Cl. H05b 37/00, 39/00, 41/14
U.S. Cl. 315—241                              8 Claims

ABSTRACT OF THE DISCLOSURE

An energy storage and transfer system is shown for delivering a series of pulses of substantially equal energy level from a source of varying direct current voltage to a xenon arc lamp. The power source is connected across the primary winding of a transformer and the output of an electronic switch whose function is to alternately connect and disconnect the winding from the source. A control circuit including a unijunction oscillator and a monostable multivibrator connected to the electronic switch controls the time per cycle the winding is connected across the source to control the energy accumulation in the winding. A resistance-capacitance timing circuit operating in conjunction with a Zener diode connected across the multivibrator operates to control the electronic switch such that the "on time" per cycle is inversely proportional to the power source voltage, making the amount of energy stored substantially equal in each pulse. The energy stored in the primary winding is then induced into the secondary winding and is used to charge a capacitor across which the arc lamp is connected. A pulse from the electronic switch is connected to the control electrode of the lamp to initiate firing.

Background of the invention

The basic technique for using an inductive energy storage and transfer system is well known. In systems of this type, the charging of the inductor is accomplished by effectively switching the inductor across the power supply. As the current rises at a rate proportional to voltage, the energy contained in the inductor equals one-half the inductance (L) times the current squared ($I^2$), and the total energy delivered to the inductor will then be proportional to the supply voltage, $E^2$, at the end of any given time T. In the systems that have used this type of approach, the time is usually constant, and as a result the energy delivered into the system via the inductor varies as the square of the supply voltage. One application for which this technique has been used is in connection with an electronic stroboscope. In general, such applications have always operated with sources of electrical power wherein the voltage was maintained within reasonably close limits. For information on a typical prior art application, reference is given to the General Radio "Experimenter," vol. 40, No. 4, April 1966, wherein a technique of this type is described in connection with the "Strobotac" electron stroboscope.

Summary

In the application for which the present invention was devised, it was desired to operate a xenon lamp from a power source wherein the voltage varied over a wide range. In order for the lamp to supply flashes of equal intensity, it is necessary that it receive pulses of electrical energy in which the total energy level on a pulse-to-pulse basis is essentially constant. Sufficient voltage must be supplied to cause the desired arcing action to occur within the lamp, but the intensity of each flash, once sufficient voltage is made available, varies essentially with the total energy level per input pulse. In the present arrangement, a circuit is provided in which the timing arrangement is so constructed that the time during which the charging switch is closed (and the inductor is permitted to charge) is caused to vary in inverse relationship to the voltage of the supply source. By this means, constant energy is delivered to the inductor irrespective of the input voltage within, of course, specific limits. A circuit is provided which acts as a timer for a switch, which timer controls the "on" time of the switch in inverse relationship to the voltage supplied to the circuit, and this operates independently of the operation of any other timing circuit, such as that which establishes the repetition rate of the controlled pulses or energy impulses. The basic pulse repetition frequency is supplied by means of a conventional unijunction oscillator whose pulse repetition frequency remains essentially constant. This input is supplied to a "one-shot" or monostable multivibrator, also connected to the input power supply. The voltage drop across the first monostable multivibrator transistor is controlled by means of a Zener diode, and a resistance-capacitance circuit is connected between the emitter of this transistor and the power supply in such manner that a charge of controlled magnitude will build up across the capacitor but at a rate which varies with the input voltage. The controlled charge is impressed across the input to the second transistor of the monostable multivibrator by the switching action of the unijunction multivibrator when it is triggered by the oscillator. The capacitor is then discharged, and the time required to discharge the capacitor is the "on time" of the switch. When the transistor switch is turned on (conducting), the power supply voltage is impressed across the inductor by connecting one terminal of the inductor through the transistor switch to ground, the other terminal being connected to the power supply causing current to build up in the inductor. When the switch is nonconducting, the circuit is opened.

In the system described herein, the inductor is actually the primary winding of a transformer. A secondary winding of this same transformer is connected through a rectifier in parallel with a capacitor. Also in parallel with the capacitor is a xenon arc lamp which is supplied with a high voltage stored on the capacitor. During the time energy is building up on the primary winding of the transformer, there is no flow through the circuit containing the secondary winding because of the action of the rectifier. When the transistor switch opens, the energy in the primary winding of the transformer is transferred into the secondary winding through the rectifier and builds up on the capacitor in the secondary circuit. Through triggering means associated with the semiconductor switch arrangement, the capacitor is discharged through the xenon lamp when the lamp is fired. The illumination provided by the lamp, assuming that it receives sufficient voltage to fire at all, is essentially proportional to the energy level in the pulses supplied to its control electrode. Since the energy stored in the primary winding of the transformer is essentially constant, and since this energy can be transferred at almost 100% efficiency into the capacitor, the energy in the capacitor will be directly related to the energy stored in the inductor at the beginning of the transfer operation. The inductor utilized would not necessarily have to be a transformer, but this has proved to be a useful arrangement for the present application.

Brief description of the drawing

The single figure shows a schematic drawing of a circuit utilizing my constant energy power source in combination with a circuit to control the flashes from a xenon arc lamp.

Description of the preferred embodiment

In the drawing, a power source is shown at numeral 10 which may consist of a nominal 24-volt source. As is well recognized in the art, when this voltage is supplied from a battery, the actual voltage may vary from 30 to 18 volts as the battery charge is depleted. The source 10 is connected to a conventional unijunction oscillator including a unijunction transistor 12 which has its base 2 connected to the source through a resistor 14 and base 1 connected to a low potential source through a resistor 16. The emitter is connected to the power source through a resistor 18 and to the low potential source through a capacitor 20. This unijunction oscillator produces at its base 2 a pulse output which is supplied through a diode 22 to the base of a transistor 24 forming part of a monostable multivibrator 26. The collector of transistor 24 is connected to the power source through a resistor 28 and also through a timing circuit consisting of a capacitor 30 and a resistor 32. Also connected to the collector circuit of transistor 24 is a Zener diode 34 which performs a voltage regulating function. Connected to a junction between capacitor 30 and resistor 32 is a diode 36 which is connected directly to the base of a second transistor 38 whose function is as an amplifier and also as a means of providing the feedback signal to the base of transistor 24 which is connected through a resistor 42. A capacitor 44 connected in parallel with resistor 42 is a conventional "speed-up" capacitor for the purpose of insuring that a feedback pulse reaches the base of transistor 24 in the time to establish regenerative action before the triggering pulse from the unijunction oscillator is dissipated. Capacitor 30 and resistor 32 operate in conjunction with the Zener diode 34 to vary the effective "on" time of the monostable multivibrator 26 with changes in the power supply voltage. Since the Zener diode 34 effectively controls the voltage level at the collector of transistor 24, voltage variations will appear between this collector and the input terminal 10. The Zener diode effectively limits the unit charge on the capacitor 30 to a constant value so that it is the rate of discharge of capacitor 30, through resistor 32, which now varies solely as a function of the supply voltage. The diode 36 provides the function of limiting the negative charge which can be supplied to the base of transistor 38 to avoid driving this base too far negative. Thus the multivibrator output is caused to vary the "on time" pulse width of its output in inverse proportion to the voltage of the power supply. The higher the power supply voltage, the faster capacitor 30 will discharge, and conversely, the lower the power supply voltage, the longer will be required for the discharge.

The output of the multivibrator 26 is connected to an electronic switch 45 and specifically to the base of a transistor 46 which is connected in a common emitter configuration to the power supply terminal 10. Transistor 54 is properly biased by means of resistors 48 and 50 in the emitter of transistor 46, and a capacitor 52 is connected between the emitter and the base of the succeeding transistor 54 as a means for insuring that transistor 54 conducts heavily for a short duration. Transistor 54 is also connected to the power supply through a resistor 56, and its emitter is connected directly to the base of a transistor 58 which has its collector connected directly to one side of the primary winding of a transformer 60. The opposite side of this primary winding is connected to the input power supply at terminal 10. A Zener diode 62 is connected between the collector and emitter circuits of transistor 58 as a protective device, as will be further described hereinafter.

The secondary winding of transformer 60 is connected through a rectifier 64 and across a capacitor 66, and this capacitor is, in turn, connected across a xenon arc lamp 68. Also connected to the high voltage side of the capacitor 66 is a conductor 70 which is connected through a voltage-dividing network 72, through a secondary winding 73 of a transformer 74 to the control electrode of the lamp 68. As the voltage increases across the capacitor 66, enough voltage is supplied via conductor 70 through the voltage divider 72 and the secondary winding 73 to terminal 1 of the lamp 68 to maintain the potential on this terminal at a value which will prevent premature arcing of the lamp. The value chosen is approximately one-half the voltage impressed across the opposing terminals of the lamp.

It will be observed that a capacitor 76 is connected in the collector circuit of transistor 54, and the opposite side of this capacitor is connected to the primary winding of transformer 74. It is the function of this circuit to provide an input or triggering pulse to the transformer 74, which pulse is coupled through the secondary winding 73 to cause the arc lamp 68 to fire. An additional secondary winding 80 is connected in circuit with a rectifier 82 for the purpose of providing a damping function. This arrangement tends to prevent an inductive "kick" which otherwise might tend to damage some of the components in the system, particularly the transistors in the electronic switch 45.

Operation of the above described system will be quite straightforward if the individual subassemblies are considered. The unijunction transistor 12 is connected as a conventional relaxation oscillator, and its output frequency does not vary significantly with voltage changes because the point at which conduction occurs tends to shift with the supply voltage. This unijunction oscillator produces a pulse which is connected through the diode 22 to trigger the "one-shot" or monostable multivibrator 26. When transistor 24 conducts, the accumulated charge on capacitor 30 is immediately grounded and thereafter begins to discharge from a magnitude controlled by Zener diode 34 but for a time period controlled by resistor 32 and which varies inversely with the voltage at terminal 10, as previously described. Thus the monostable multivibrator 26 has an output supplied to the electronic switch 45, and particularly to the first stage transistor 46 which consists of a rectangular wave of substantially constant frequency but whose conductive half cycles vary inversely with the supply voltage. Transistors 46 and 54 are connected in emitter-follower configuration to avoid loading the multivibrator 26. Since the primary winding of transformer 60 is connected to the collector of transistor 58, and also to the input power supply terminal 10, it will be appreciated that when transistor 58 conducts the power supply is connected across the primary winding, and current will tend to build up through the transformer linearly with time, and the energy at any time is equal to $\frac{1}{2}LI^2$. During this time, no energy is transferred into the secondary winding of transformer 60 because of the action of rectifier 64. When transistor 58 stops conducting, energy from the primary winding is induced into the secondary winding and is of proper polarity to be conducted by the rectifier 64 and accumulates on capacitor 66. This charge causes a high voltage potential across the higher voltage terminals of lamp 68, and part of this is connected through conductor 70 and the voltage divider 72, the secondary winding 73 of transformer 74 to the control electrode of the lamp 68. When the transistor 54 begins conducting, a sharp negative-going pulse is supplied through capacitor 76 to transformer 74, and this pulse is inductively coupled to the secondary winding 73, from whence it is supplied to the control electrode of lamp 68 to cause the lamp to fire. At this time the energy stored on capacitor 66 is dissipated across the lamp, and the quantity of energy dissipated is always essentially the same as set forth above. Diode 82 acts to short-circuit any current from the trigger element of lamp 68, when the lamp fires, that would cause false triggering of the monostable multivibrator and also tends to damp out resonant ringing of the transformer.

The Zener diode 62 which is connected between the collector and emitter circuits of transistor 58 and from thence to ground is primarily a protective device, since if for any reason the lamp fails to fire and repetitively discharge capacitor 66, the voltage in the circuit tends to build up in successive steps and may become sufficiently high to damage some of the components. A diode 84 connected in the collector circuit of transistor 54 is another protective device. Inasmuch as extremely large currents flow in the lamp-firing circuit for short periods, there is a danger that large voltage surges will be induced in the reverse direction through transformer 74 and back into the transistor switch. Diode 84 is poled in such manner that such reverse surges are connected directly to ground.

Although only a single embodiment is shown and described herein, modifications may be made within the scope of the present invention, and I do not desire to be limited other than in accordance with the following claims.

I claim:

1. A circuit for delivering pulses of substantially constant energy to an energy conversion device from a direct current power source whose voltage level is subject to substantial variations comprising:
   an oscillator connected to said power supply for producing pulses at substantially uniform intervals,
   a monostable multivibrator connected to said power supply and to receive pulses from said oscillator, the connections to said power supply including resistance means and capacitance means connected in a turning circuit, a voltage-regulating means connected to limit the magnitude of the charge on said capacitance means and said resistance means being connected to limit the rate of discharge of said capacitance means in substantially inverse proportion to the voltage level of said power source such that said monostable multivibrator produces a pulse output with the pulse widths varying in substantially inverse proportion to the voltage level of said power source,
   an electronic switching device connected to receive the pulse output from said monostable multivibrator,
   an inductor connected to said power source and to said switching device such that voltage builds up across said inductor only when the output pulses of said switching device are of a desired polarity, and
   circuit means connecting the energy stored in said inductor to said energy conversion device.

2. A circuit for delivering constant energy pulses as set forth in claim 1 wherein said circuit means includes a transformer and said inductor forms a primary winding of said transformer, a secondary winding of said transformer is connected to said energy conversion device, said connections including a capacitor for storing a charge from said transformer and pulse supply means for controlling the discharge of energy from said capacitor across said energy conversion device.

3. A circuit for delivering constant energy pulses as set forth in claim 2 wherein said energy conversion device comprises an arc lamp having a firing electrode, said capacitor is connected across said lamp, and said pulse supply means includes a second transformer having a winding connected to said firing electrodes, said transformer being connected to said electronic switching device through a second capacitor.

4. A circuit for delivering constant energy pulses as set forth in claim 1 wherein said oscillator is a relaxation oscillator having a unijunction transistor.

5. A circuit for delivering constant energy pulses as set forth in claim 1 wherein said monostable multivibrator includes a transistor connected in a common emitter configuration and said timing circuit includes a capacitor and a resistor connected between said transistor and said power source, and said voltage-regulating means includes a Zener diode connected between the collector of said transistor and ground.

6. A circuit for delivering pulses of energy to an energy conversion device from a direct current source whose voltage is subject to substantial variation including
   an inductive energy storage device connected to said current source,
   circuit means for transferring energy from said inductive energy storage device to said energy conversion device,
   an electronic switch connected to said inductance energy storage device and to said power source for alternately connecting and disconnecting said power source from said inductive energy storage device,
   a multivibrator connected to said power source and to said electronic switch for controlling the timing of the connecting and disconnecting cycles of said electronic switch,
   an oscillator connected to said power source and to said multivibrator for producing triggering pulses to said multivibrator at substantially uniform intervals,
   characterized in that a timing circuit, including a resistor and a capacitor, is connected between said power source and said multivibrator and a voltage-regulating device is connected across said multivibrator such that the charge accumulated on said capacitor is controlled to a substantially constant value and the rate of charge decay on said capacitor varies inversely with the voltage of said power source, thereby causing said electronic switch to control the time that said inductive energy storage device is connected to said power source to be inversely proportional to said voltage.

7. A circuit for delivering constant energy pulses as set forth in claim 6 wherein said circuit means includes a transformer and said inductive energy storage device forms a primary winding of said transformer, a secondary winding of said transformer is connectde to said energy conversion device, said connections including a capacitor for storing a charge from said transformer and pulse supply means for controlling the discharge of energy from said capacitor across said energy conversion device.

8. A circuit for delivering constant energy pulses as set forth in claim 7 wherein said energy conversion device comprises an arc lamp having a firing electrode, said capacitor is connected across said lamp, and said pulse supply means includes a second transformer having a winding connected to said firing electrode, said transformer being connected to said electronic switch through a second capacitor.

References Cited

UNITED STATES PATENTS

| | | | |
|---|---|---|---|
| 3,341,737 | 9/1967 | Rosa | 315—194 |
| 3,421,107 | 1/1969 | Keller | 331—113 |
| 2,997,665 | 8/1961 | Sylvan | 331—113 |
| 3,310,708 | 3/1967 | Seidler | 315—225 |

JOHN W. HUCKERT, Primary Examiner

B. ESTRIN, Assistant Examiner

U.S. Cl. X.R.

307—294, 296, 299, 301; 331—111, 113, 143, 144; 321—4